US009008809B2

(12) United States Patent
Tournier et al.

(10) Patent No.: US 9,008,809 B2
(45) Date of Patent: Apr. 14, 2015

(54) REDUNDANT CONTROL FOR A PROCESS CONTROL SYSTEM

(75) Inventors: Jean-Charles Tournier, Bellegarde sur Valserine (FR); Thomas Werner, Baden (CH)

(73) Assignee: ABB Research Ltd, Zurich (CH)

(*) Notice: Subject to any disclaimer, the term of this patent is extended or adjusted under 35 U.S.C. 154(b) by 281 days.

(21) Appl. No.: 13/410,463

(22) Filed: Mar. 2, 2012

(65) Prior Publication Data

US 2012/0226367 A1 Sep. 6, 2012

Related U.S. Application Data

(63) Continuation of application No. PCT/EP2010/062087, filed on Aug. 19, 2010.

(30) Foreign Application Priority Data

Sep. 2, 2009 (EP) .................................... 09169253

(51) Int. Cl.
*G05B 19/048* (2006.01)
*G05B 9/03* (2006.01)

(52) U.S. Cl.
CPC ........................................ *G05B 9/03* (2013.01)

(58) Field of Classification Search
None
See application file for complete search history.

(56) References Cited

U.S. PATENT DOCUMENTS

| 4,141,066 A | 2/1979 | Keiles |
| 5,202,822 A | 4/1993 | McLaughlin et al. |
| 6,173,312 B1 | 1/2001 | Atarashi et al. |
| 6,591,150 B1 | 7/2003 | Shirota |
| 7,437,203 B2 * | 10/2008 | O'Donnell et al. ............. 700/82 |
| 2007/0206644 A1 * | 9/2007 | Bertsch et al. ................ 370/503 |
| 2007/0270984 A1 * | 11/2007 | Lobig et al. ..................... 700/82 |

FOREIGN PATENT DOCUMENTS

EP   0 478 288 A2   4/1992

OTHER PUBLICATIONS

International Preliminary Report on Patentability and Written Opinion (PCT/IB/373 and PCT/ISA/237) issued on Mar. 6, 2012 by European Patent Office as the International Searching Authority for International Application No. PCT/EP2010/062087.
International Search Report (PCT/ISA/210) issued on Nov. 24, 2010, by European Patent Office as the International Searching Authority for International Application No. PCT/EP2010/062087.
European Search Report for EP 09169253 dated Sep. 21, 2010.

* cited by examiner

*Primary Examiner* — Ryan Jarrett
(74) *Attorney, Agent, or Firm* — Buchanan Ingersoll & Rooney PC

(57) ABSTRACT

Exemplary methods and systems are directed to a process control system having a main control device for controlling a primary equipment of the primary system and a backup control device for controlling the primary equipment in case of a failure of the first control device. A command redirection device for the process control system, is adapted to receive a control command destined to the main control device, and to redirect, in the event of a failure of the main control device, said control command to the backup control device.

18 Claims, 8 Drawing Sheets

```
foreach (ied in ListIEDS)//Parallel execution
{
  ping ( ied);
  wait_for_pong ( ied, time_out) ;
  if (time_out == expired)
  {
  ied_backup = retrieveBackupIED ( ied);
  redirectConnection ( ied, ied_backup);
  }
  else
  {
  directConnection ( ied);
  }
}
```

Fig. 7

```
sendToIED( Packet command)
{
   if ( redirect == true)
   {
      modifyDestinationIP( command);
   }
   forward( command);
}
```

Fig. 8

```
sendToScada( Packet confirmation)
{
   if ( redirect == true)
   {
      modifySourceIP( confirmation);
   }
   forward( confirmation);
}
```

Fig. 9

REDUNDANT CONTROL FOR A PROCESS CONTROL SYSTEM

RELATED APPLICATION(S)

This application claims priority as a continuation application under 35 U.S.C. §120 to PCT/EP2010/062087, which was filed as an International Application on Aug. 19, 2010 designating the U.S., and which claims priority to European Application 09169253.3 filed in Europe on Sep. 2, 2009. The entire contents of these applications are hereby incorporated by reference in their entireties.

FIELD

The disclosure relates to process control systems, such as command redirection device a process control system.

BACKGROUND INFORMATION

Substations in high and medium-voltage power networks include primary equipment such as electrical cables, lines, bus bars, switches, power transformers and instrument transformers, which are generally arranged in switch yards and/or bays. Such primary equipment is operated in an automated way via a process control system, for example a substation automation system. A process control system or substation automation system may include secondary devices or control devices, among which intelligent electronic devices (IED) may be responsible for protection, control, and monitoring of the primary equipment. The secondary devices can be assigned to hierarchical levels, i.e. the station level, the bay level, and the process level, the latter being separated from the bay level by a so-called process interface. The station level of the substation automation system may include an operator workstation with a human-machine interface and a gateway to a network control center. Intelligent electronic devices on the bay level, also termed bay units or protection IEDs, in turn may be connected to each other within a bay and/or on the station level via an inter-bay or station bus primarily serving the purpose of exchanging commands and status information.

Exemplary secondary devices on the process level can include comprise sensors for voltage (VT), current (CT) and gas density measurements, contact probes for sensing switch and transformer tap changer positions and/or actuators (I/O) for changing transformer tap positions, or for controlling a switch gear like circuit breakers or disconnectors.

A communication standard for communication between the intelligent electronic devices of a substation has been introduced by the International Electronic Committee (IEC) as part of the standard IEC 61850 entitled "Communication networks and systems in substations".

For non-time critical messages, IEC 61850-8-1 specifies the manufacturing message specification (MMS, ISO/IEC 9506) protocol based on a reduced open system interconnection (OSI) protocol stack with the transmission control protocol (TCP) and Internet protocol (IP) in the transport and network layer, respectively, and Ethernet as physical media.

For time critical messages, such as trip commands, IEC 61850-8-1 specifies the generic object oriented substation events (GOOSE) built directly on the Ethernet link layer of the communication stack. For very time critical signals at the process level such as measured analog voltage or currents IEC 61850-9-2 specifies the sampled values (SV) protocol which also builds directly on the Ethernet link layer.

Exemplary embodiments disclosed herein can relate to the field of control systems for power grids operations using the IEC 61850 standard. Control operations, such as closing or opening primary switches, can be performed by a substation operator through a station-SCADA system. Such commands may not be directly sent to the primary equipments, but rather to an intelligent electronic device which performs the associated control function (for example interlocking verification) and then executes the operation (for example open the breaker). Known substation automation architectures may be made of one IED per bay for control operations (see FIG. 1).

The control operations may be performed using the IEC 61850-8-1 protocol, meaning that communications between the station-SCADA system and any IED are based on MMS for control operations. Control operations may be based on the "select before operate" (SBO) principle. The operator first may send an order to select the primary equipment he wants to operate and then sends a second command to realize/execute the command. Finally, confirmation of the execution of the command may be sent back to the operator. Because of the SBO principle, control may be exclusive, i.e. only one IED can control primary equipment at the same time. Hence, and contrary to protection functions, the control functions in known substation automation systems are generally not duplicated (see FIG. 2). The protection functions may be duplicated due to reasons of safety. In the case that a protection function malfunctions, a redundant protection function may take over the tasks of the malfunction protection function.

Improving system reliability has been widely explored over the past decades. There can be four major forms of redundancy which may be (1) hardware redundancy, such as double or triple redundancy, (2) information redundancy, such as error detection and correction methods, (3) time redundancy, including transient fault detection methods such as Internet logic and (4) software redundancy, such as N-version programming. In the context of substation automation, the known approaches for redundancy may be based on the hardware and hot redundancy concept. The other possibility may be a hot-standby redundancy concept. In a hot-hot architecture, both IEDs are running in parallel, while for a hot-standby architecture the standby IED is taken into active use, when the hot IED fails. In known systems, both approaches can be realized by hard-wiring the inputs and outputs of both IEDs to the respective CT/VTs (sensor input) and breaker actuators (I/O).

The technological progress on software virtualization may allow executing two different software systems on the same device as if it was executed on two different physical devices. One can think about combining protection and control functionalities into one physical device and reduce the number of IED devices to provide a cleaner redundancy chain down to the primary equipment. To take full advantage of this new configuration, the control functions can be redundant as well (see FIG. 3). Further, a classical hot-hot redundancy may not be possible since the control operations should be exclusive, i.e. they should not be performed by two different IEDs at the same time (SBO, see above). Therefore, hot-standby redundancy architectures can be used. To this end, two main approaches may be considered for redundant control functions:

For any given bay, IEDs may be duplicated. The station-SCADA system may be aware of the duplicated IEDs and first may interact with the original ones and then switch to the duplicated ones in case of a fault. The main drawback of this architecture is the need to modify the SCADA system which can be a very complex task.

Another approach may be to have the duplicated IED checking at regular intervals the state of the original IED and in case of a failure to impersonate it, i.e. substituting its own IP address by the one of the original IED. While this approach is transparent towards the SCADA system, it can specify a complex task of impersonation at the IED level. Moreover, this task is even technically not durable with the operating systems running on the IEDs and can even be impossible if the original IED "freezes" without releasing its IP address.

While redundant control is feasible, the above main approaches may specify complex modifications on either the station-SCADA system or the IEDs side.

SUMMARY

An exemplary command redirection device for a process control system, such as a substation automation system is disclosed, the process control system comprising: a main control device for controlling primary equipment of a primary system; and a backup control device for controlling the primary equipment in case of a failure of the first control device, wherein the command redirection device is adapted to receive a control command destined to the main control device, and redirect, in the event of a failure of the main control device, said control command to the backup control device.

An exemplary process control system for a primary system is disclosed, comprising: a command device for generating control commands for a piece of primary equipment; a main control device for controlling the piece of primary equipment of the primary system; a backup control device for controlling the piece of primary equipment in case of a failure of the first control device; and a command redirection device.

An exemplary SCADA system is disclosed, comprising: a command redirection device, wherein the SCADA system is adapted for generating the control command.

An exemplary method for a process control system of a primary system is disclosed, the method comprising: sending a control command to a main control device, the main control device being adapted for controlling a primary equipment of the primary system; detecting a failure of the main control device; and redirecting the control command for the main control device to a backup control device, if the failure of the main control device has been detected, the backup control device being adapted for controlling the primary equipment of the primary system.

An exemplary computer-readable medium, in which a computer program for a process control system of a primary system is stored, which, when the computer program is executed by a processor, the processor executes a method comprising: sending a control command to a main control device, the main control device being adapted for controlling a primary equipment of the primary system; detecting a failure of the main control device; and redirecting the control command for the main control device to a backup control device, if the failure of the main control device has been detected, the backup control device being adapted for controlling the primary equipment of the primary system.

BRIEF DESCRIPTION OF THE DRAWINGS

The subject matter of the disclosure will be explained in more detail in the following text with reference to exemplary embodiments which are illustrated in the attached drawings.

FIG. 7 shows a first program element in accordance with an exemplary embodiment of the disclosure;

FIG. 8 shows a second program element in accordance with an exemplary embodiment of the disclosure; and FIG. 9 shows a third program element in accordance with an exemplary embodiment of the disclosure.

DETAILED DESCRIPTION

Figure 1:
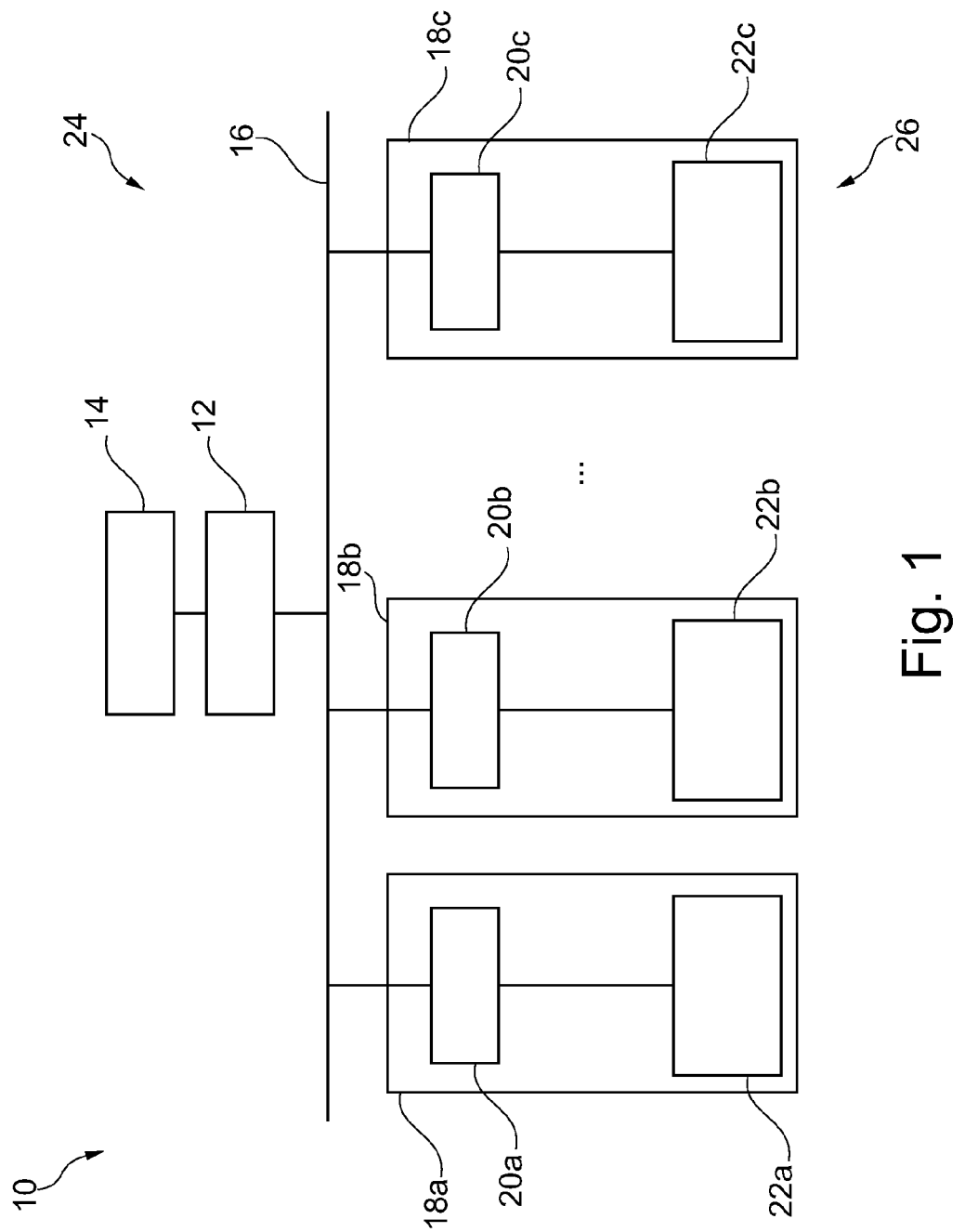
FIG. 1 shows a first substation automation system in accordance with an exemplary embodiment.

Exemplary embodiments of the disclosure provide redundant control to a process control system without necessitating major modifications to the devices of the process control system.

An exemplary embodiment of the disclosure relates to a command redirection device for a process control system, in particular for a substation automation system.

In another exemplary embodiment of the disclosure, the process control system includes a main control device for controlling primary equipment of a primary system, a backup control device for controlling the primary equipment in case of a failure of the first control device, wherein the command redirection device is adapted to receive a control command destined to the main control device and to redirect, in the event of a failure of the main control device, said control command to the backup control device.

With such a command redirection device, transparent redundancy for control functions in electric substation automation may be provided. For example, transparent redundancy of the control functions to the intelligent electronic devices and the station-SCADA system may be provided by introducing a dedicated device, i.e. the command redirection device, on the side of the interface of the station-SCADA system. The command redirection device, which may also be called TCR (transparent control redundancy) device, may be connected to the station-SCADA system on one hand and to the station bus on the other hand, and act as a proxy for the station-SCADA when accessing the station bus. The command redirection device may be in charge of redirecting the station-SCADA control commands to another intelligent electronic device in case of a failure, so that the station-SCADA system seems at all the times to communicate with the original intelligent electronic device.

Due to the redirection device, a modification of either the main and backup control devices, for example the intelligent electronic devices, or the process control system, for example a station-SCADA system, may be avoided. Therefore, redundant control may be implemented in legacy systems without major modifications.

Such a command redirection device may have a low complexity and therefore may be reliable and cost-effective to implement control redundancy. Further, such a redirection device may allow to easily migrating secondary equipment functionality, i.e. the functionality of a main control device, to a redundant control scheme, i.e. a backup control device, without modifying any existing hardware and/or software systems.

The command redirection device may have the benefit that redundant control can be achieved at low cost and with no software and/or hardware modifications of other components of the process control system.

The command redirection device may be adapted to switch the communication from the process control system to the main control device in the case of a failure of the main control device to the backup control device. For example, a control command of the process control system is redirected to the backup control device, in case that the main control device has a failure. The process control system does not have to be aware of the backup control device and may solely send the control command to the main control device.

The main control device may be an intelligent electronic device that may be programmed to control primary equipment, for example a switch, of the primary system which may be a medium voltage or industrial substation.

According to an exemplary embodiment of the disclosure, the command redirection device can be adapted to detect a failure of the main control device. For example, every time the command redirection device receives a control command, the command redirection device may check, whether the main control device is operating properly. In the case, it detects that the main control device has a failure, it may redirect the control command to the backup control device.

According to another exemplary embodiment of the disclosure, the control command includes an identification of the main control device, wherein for redirecting the control command, the command redirection device is adapted to modify the control command by replacing the identification of the main control device with an identification of the backup control device. For example, the control command may be included in a data package sent from the process control system to the main control device. The command redirection device may extract the identification of the main control device from the data package and after that may check, if the main control device is working properly, or otherwise may be aware that the main control device is working properly. If the main control device has a failure, the command redirection device may replace the identification of the main control device with the identification of the backup control device.

In yet another exemplary embodiment of the disclosure, the command redirection device is adapted to request the identification of the backup control device by sending the identification of the main control device to an identification device, and to receive the requested backup identification from the identification device in response. In this case, the command redirection device does not have to be aware of which device of the process control system is the backup control device of the main control device. The command redirection device only has to extract the identification of the main control device and can request the identification of the backup control device from the identification device, which, for example, may be a database storing a list of all main control devices of the process control system and associated therewith the backup control devices of the process control system.

The command redirection device may not know beforehand the different backup systems or backup control devices. Instead, when a failure is detected, the command redirection device may request the address or identification of the specific backup control device, for example a backup intelligent electronic device, from a central entity. This may add flexibility to the command redirection device which would have to be reprogrammed, if the addresses of the different control devices changed.

According to an exemplary embodiment disclosed herein, the command redirection device has a first communication interface for connecting to a command device, the command device being adapted to generate the control command. For example, the command device may be a further device of the process control system. For example, it may be a human machine interface of the station-SCADA system.

In another exemplary embodiment of the disclosure, the command redirection device is adapted to receive the control command from the command device, wherein the command redirection device has a second communication interface for connection, via a data network, to the main control device and the backup control device, wherein the command redirection device is adapted for transmitting the control command to the main control device and the backup control device.

In other words, the command redirection device may be connected for communication with a command device and may be connected for communication with the main control device and the backup control device. The command redirection device may be situated in the communication path between the command device and a switch of a communication network connecting the main control device and the backup control device.

In an exemplary embodiment disclosed herein, the command redirection device may be adapted to communicate with the IEC 61850, in particular with the IEC 61850-8, protocol. The communication may be with the command device and the main and backup control devices. In this case, the command redirection device may be independent of the vendors of the main and backup control devices and the process control system, in particular the intelligent electronic devices and a SCADA system.

According to an exemplary embodiment of the disclosure, the command redirection device is adapted to modify a confirmation message confirming the execution of the control command and transmitted by backup control device by replacing an identification of the backup control device included in the confirmation message with an identification of the main control device. For example, the main control device may send a confirmation, that the control function requested by the control command has been executed by the primary equipment connected to the main control device. However, if the backup control device has taken over the function of the main control device from the main control device, the backup control device may send this confirmation. In this case, the command redirection device may modify the confirmation such that the system receiving the confirmation message, for example the command device that has generated the control command does not have to be aware that the backup control device has executed the control command and not the main control device.

According to yet another exemplary embodiment of the disclosure, the main control device is adapted to confirm the execution of the control command by transmitting a first confirmation including an identification of the main control device to the command device, wherein the backup control device is adapted to confirm the execution of the control command by transmitting a second confirmation having an identification of the backup control device to the command device, wherein the command redirection device is adapted to modify the second confirmation of the backup control device by replacing the identification of the backup control device with the identification of the main control device. Transmitting a confirmation may include creating the confirmation and sending the confirmation to the command device that has created the control command.

According to an exemplary embodiment of the disclosure, the process control system includes a further main control device for controlling a further primary equipment of the primary system. The main control device may be a first main control device and the process control system can include a further second main control device. The first main control device may control a first primary equipment and the second control device may control a further second primary equipment of the primary system. In other words, the process control system may have at least two main control devices.

In another exemplary embodiment of the disclosure, the backup control device is adapted for controlling the further second primary equipment. The backup control device may not only control the first primary equipment but may also control the second primary equipment. In this case, the backup control device may be a backup control device for the first and the second main control devices. There may only be one backup control device for at least two main control devices.

According to an exemplary embodiment of the disclosure, the command redirection device is adapted to detect a failure of the further second main control device, wherein the command redirection device is adapted to redirect a control command for the further main control device to the backup control device, if a failure of the further main control device has been detected.

For example, the backup intelligent electronic devices of the process control system may be combined into one single, station-wide backup intelligent electronic device which may centralize the control functions of all bays. In this case, the cost of the backup control system may be dramatically reduced.

A further aspect of the disclosure relates to a process control system for a primary system.

According to an exemplary embodiment of the disclosure, the process control system includes further a command device for generating control commands for a piece of primary equipment.

According to another exemplary embodiment of the disclosure, the process control system includes a main control device for controlling the primary equipment of the primary system and a backup control device for controlling the primary equipment in case of a failure of the first control device.

In yet another exemplary embodiment of the disclosure, the process control system includes a command device for generating the control command.

In an exemplary embodiment disclosed herein, the process control system includes the further second main control device.

According to an exemplary embodiment of the disclosure, the process control system can have more than one command redirection device.

In an exemplary embodiment of the disclosure, the process control system has an identification device adapted to provide, upon request by the command redirection device, the identification of the backup control device from the identification of the main control device.

According to an exemplary embodiment of the disclosure, the process control system includes further a data network. The main control device and the backup control device are connected to the data network. The control command may be a data package transmitted by the data network, the main control device may be identified by a first network address, and the backup control device may be identified by a second network address. Further, the command redirection device may transmit over the data network the data packages to the main control device and the backup control device. Further, the command redirection device may transmit data packages over the data network from the main control device and the backup control device to the command device.

In another exemplary embodiment disclosed herein, the process control system includes further a further main control device, which may be a second main control device. The backup control device may be configured to perform the control functionality of the main control device, if a failure of the main control device has been detected by the command redirection device, and of the further main control device, if a failure of the further main control device has been detected by the command redirection device. For example, the second main control device may have a different functionality (security, monitoring, controlling) for a different primary equipment. The backup control device may be adapted to download the control functionality of the main control device and the further main control device, for example, from a database and may after that be adapted to perform the functionality of the respective main control device. For example, in case of a substation automation system that an intelligent electronic device fails, a spare intelligent electronic device (the backup control device) may download the control functions located in the failing intelligent electronic device from a central server, instead of having the function pre-downloaded. This variant allows being more flexible and may have a lower power intelligent electronic device, since only one set of control functions has to be executed.

Exemplary embodiments of the disclosure relate to a SCADA system.

According to an exemplary embodiment of the disclosure, the SCADA system includes a command redirection device as described in the above and in the following. The SCADA system may be adapted for generating the control command. For example, the SCADA system includes a control room inside a human operator monitors the primary system. The control command may be generated by operations, the human operator performs with the human machine interface in the control room of the SCADA system.

An exemplary SCADA system as disclosed herein can be part of the process control system which, in addition to the SCADA system, may include further control devices.

In another exemplary embodiment of the disclosure, the command redirection device may be implemented as software of the SCADA system. For example, instead of implementing the command redirection device as a physical device, it may be implemented as a software component part or module of the operating system on which the SCADA system is running. This may have the advantage of avoiding an extra piece of hardware to be added to the process control system or the SCADA system. On the other hand, it may be specific to each operating system and network card it has to run on.

A further aspect of the disclosure relates to a use of a command redirection device for a process control system. The command redirection device may be the command redirection device as described in the above and the following.

Exemplary embodiments of the disclosure also relate to a method for a process control system of a primary system.

According to another exemplary embodiment disclosed herein, the method includes the steps of: sending a control command to a main control device, the main control device being adapted for controlling a primary equipment of the primary system; detecting a failure of the main control device; redirecting the control command for the main control device to a backup control device, if the failure of the main control device has been detected, the backup control device being adapted for controlling the primary equipment of the primary system.

According to an exemplary embodiment of the disclosure, the method comprises further the step of: executing the control command on the main control device, if the main control device is working properly; executing the control command on the backup control device, if the main control device has a failure.

In another exemplary embodiment of the disclosure, the method further comprises the step of: sending a confirmation of the execution of the control command.

According to an exemplary embodiment disclosed herein, the method includes the step of: substituting the identification of the backup control device by the identification of the main control device in the confirmation.

Other exemplary embodiments of the disclosure relate to a computer-readable medium, in which a computer program for a process control system of a primary system is stored, which, when being executed by a processor, is adapted to carry out the steps of the method for process control system of a primary system as described in the above and in the following.

The computer-readable medium may be a floppy disk, a hard disk, a CD, a DVD, an USB (Universal Serial Bus) storage device, a RAM (Random Access Memory), a ROM (Read Only memory) and an EPROM (Erasable Programmable Read Only Memory). The computer readable medium may also be a data communication network, e.g. the Internet, which allows downloading a program code.

A further aspect of the disclosure relates to a program element for a process control system of a primary system, which, when being executed by a processor, is adapted to carry out the steps of the method for a process control system of a primary system as described in the above and in the following.

For example, the processor for executing the program element may be a processor of the command redirection device. For example, the command redirection device may be a physical device including a board with two Ethernet connections. The board may be a FPGA (field programmable gate array) board. The one Ethernet connection may be connected to a process control system, for example, the SCADA system and the other Ethernet connection may be connected to the station bus, the main control device, and the backup control device. The board may further include a memory storing the program element, which may be implemented in VHDL (very high speed integrated circuit hardware description language), and a processor which may be adapted to execute the program element.

These and other aspects of the disclosure will be apparent from and elucidated with reference to the embodiment described hereinafter.

The reference symbols used in the drawings, and their meanings, are listed in summary form in the list of reference symbols. In principle, identical parts are provided with the same reference symbols in the figures.

FIG. 1 shows a first substation automation system in accordance with an exemplary embodiment. As shown in FIG. 1, a substation automation system 10 has an interface 12 to a SCADA system 14. The station-SCADA system 14 may run on a station-level operation workstation (OWS) with a human-machine interface (HMI). There, a human operator may monitor the substation automation system 10 and may advise the station-SCADA system 14 to generate control commands for the substation automation system 10.

The interface 12 is connected to a data bus 16 which may be operated using the IEC 61850 standard. The data bus 16 is connected to a plurality of bays 18a, 18b, 18c including a first bay 18a and a second bay 18b. Each of the bays 18a, 18b, 18c has a main control device 20a, 20b, 20c for example an intelligent electronic device 20a, 20b, 20c, that is controlling a primary equipment 22a, 22b, 22c. For example, the first bay 18a includes a first IED 20a for controlling a first primary equipment 22a and the second bay 18b has a second IED 20b for controlling a second primary equipment 22b. The data bus 16 is connected to the first IED 20a, the second IED 20b and the further IEDs 20c. Control commands from the SCADA system 14 may be sent over the data bus 16 to the IEDs 20a, 20b, 20c as data packages on the data bus 16. After having received a control command, the respective IED 20a, 20b, 20c executes the control function on the primary equipment 22a, 22b, 22c, which, for example may be a high power switch or a breaker, which may be opened or closed in reaction to the control command. After the control command has been executed, the respective IED 20a, 20b, 20c sends a confirmation back to the SCADA system 14. To this end, the IED 20a, 20b, 20c prepares a confirmation being a data packet sent over the data bus 16 comprising the address of the SCADA system 14.

A process control system 24 of the substation automation system 10 may includes the interface 12, the data bus 16 and the IEDs 20a, 20b, 20c.

A primary system 26 that is controlled by the process control system 24 and the SCADA system 14 may include the primary equipment 22a, 22b, 22c.

The primary system 26, for example, may be a power distribution system and the station-SCADA system 14 may be part of a network management center of the power provider operating the power distribution system 26.

The exemplary substation automation system shown in FIG. 1 can have an exemplary arrangement including one IED 20a, 20b, 20c per bay 18a, 18b, 18c performing the control functions of the respective primary equipment 22a, 22b, 22c.

Figure 2:
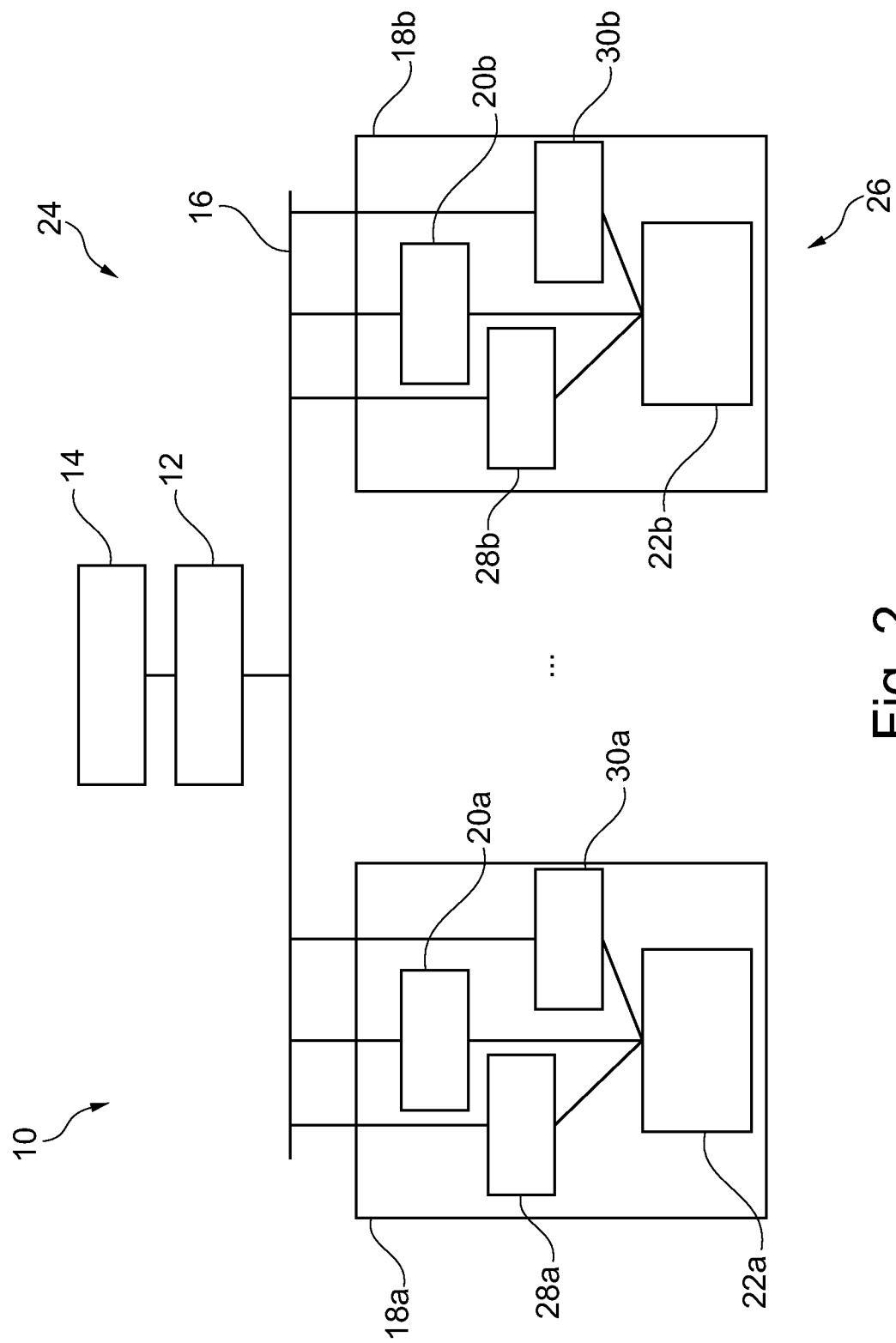
FIG. 2 shows a second substation automation system in accordance with an exemplary embodiment.

FIG. 2 shows a second substation automation system in accordance with an exemplary embodiment. In the exemplary substation automation system 10 of FIG. 2, in each bay 18a, 18b there is a protection device 28a, 28b. The bay 18a includes a first protection device 28a and the bay 18b includes a second protection device 28b. Each of the protection devices 28a, 28b is connected to the first and second primary equipment 22a, 22b, respectively, and can react independent from the rest of the system on the level of protection. For example, the protection device 28a, 28b is an intelligent electronic device that is connected to a sensor detecting the state of the primary equipment 22a, 22b. The data generated by the sensors and gathered by the protection devices 28a, 28b may be sent over the bus 16 to the station-SCADA system 14.

Each of the bays 18a, 18b of FIG. 2 further includes a redundant protection device 30a, 30b. i.e., the first bay 18a has a first redundant protection device 30a and the second bay 18b has a second redundant protection device 30b. In case of a failure of the protection device 28a, 28b, the redundant protection device 30a, 30b can take over the protection functionality of the failed protection device 28a, 28b.

In the substation automation system shown in FIG. 2, the control functionalities of the IEDs 20a, 20b are not duplicated but the protection functionalities of the protection devices 28a, 28b are duplicated by the redundant protection devices 30a, 30b. The substation automation system 10 of FIG. 2 has redundant protection functions and one control function per bay.

The intelligent electronic devices 20a, 28a, 30a, 20b, 28b, 30b shown in FIG. 2 may be distinct physical devices, each of which, for example, has a processor of its own.

Further, due to software virtualization, it can be possible to execute different software systems on the same device, as if it was executed on two different physical devices.

Figure 3:
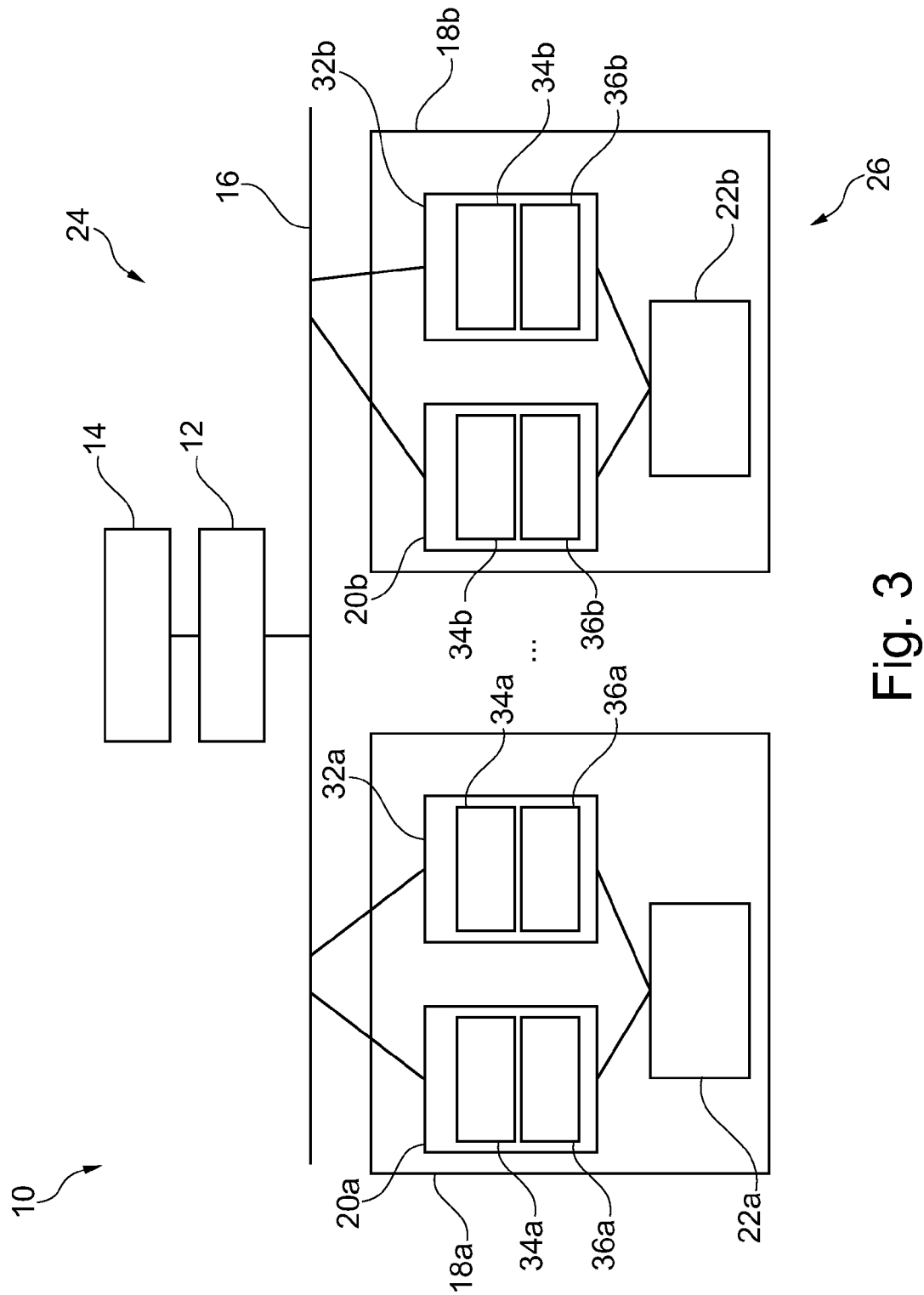
FIG. 3 shows a third substation automation system in accordance with an exemplary embodiment.

FIG. 3 shows a third substation automation system in accordance with an exemplary embodiment. As shown in FIG. 3, the substation automation system 10 has redundant protection and control functions merged into one IED.

Each of the bays 18a, 18b of FIG. 3 includes a main control device 20a, 20b and a redundant main control device 32a, 32b. The main control devices 20a, 20b and the backup control devices 32a, 32b all may be intelligent electronic devices.

The main control devices 20a, 20b and also the backup control devices 32a, 32b are connected to the data bus 16. Further, the first main control device 20a and the first backup control device 32a of the first bay 18a are connected to the first primary equipment 22a and both are adapted for controlling the first primary equipment 22a. Similar, the main control device 20b and the backup control device 32b in the bay 18b are adapted to control the primary equipment 22b.

In the substation automation system 10 shown in FIG. 3, the protection and control functions are merged into one IED. For example, the main control device 20a or IED 20a has a protection module 34a and a control module 36a. The backup control device 32a or redundant IED 32a also has the protection module 34a and the control module 36a. Similar, the IEDs 20b, 32b have protection modules 34b and control modules 36b. Since the control devices 20a, 20b have the same functionalities as the backup control devices 32a, 32b, the protection module 34a, 34b and the redundant protection module 36a, 36b of the devices situated in each bay may have identical functionalities, since they are controlling the same primary equipment 22a and 22b, respectively.

However, if, for example, main control device 20a fails, the interface 12 to the SCADA system 14 or the SCADA system 14 itself has to be aware, that the first control device 20a has failed and has to address its control commands to the backup control device 32a.

Figure 4:
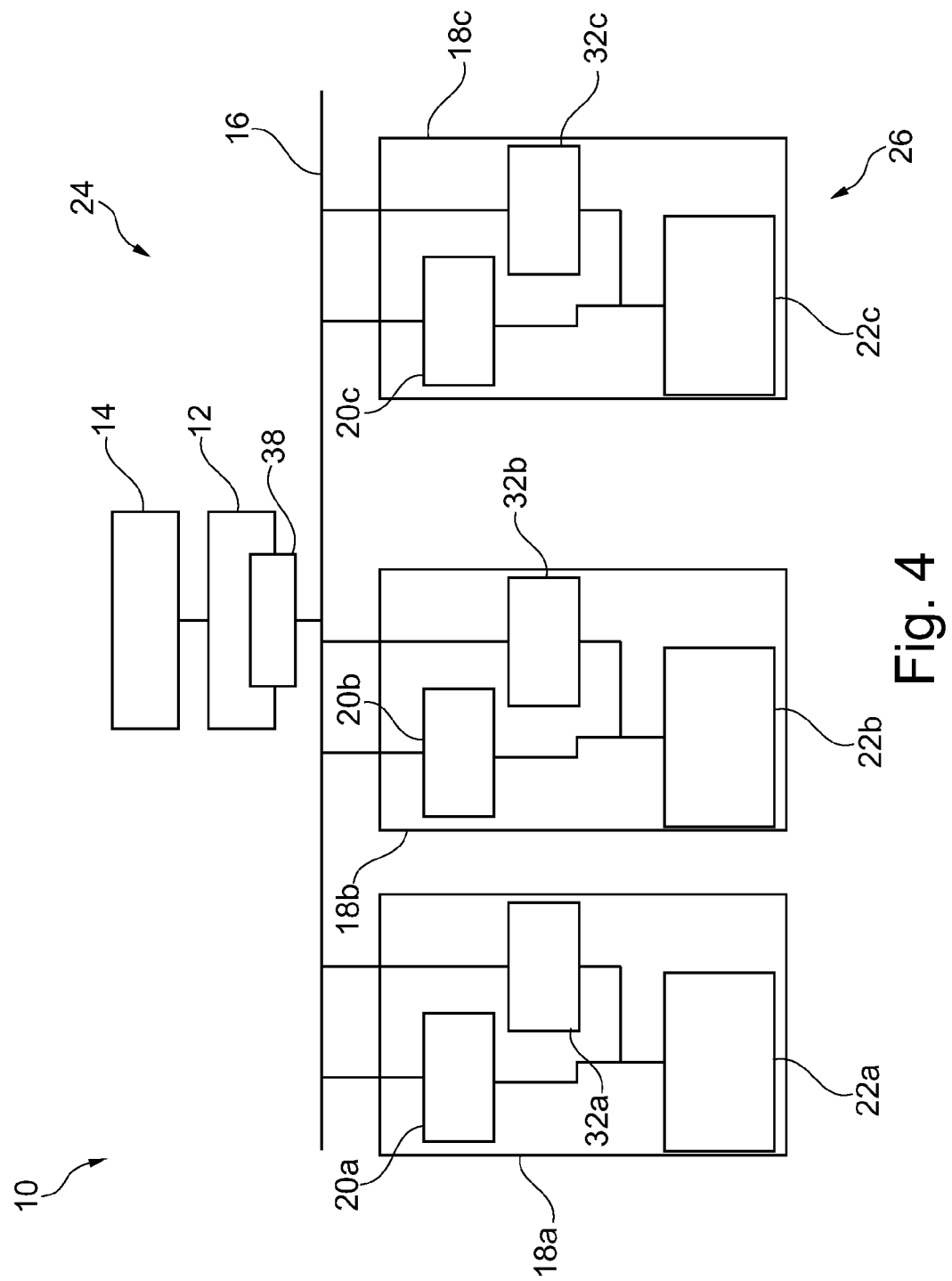
FIG. 4 shows a fourth substation automation system in accordance with an exemplary embodiment.

FIG. 4 shows a fourth substation automation system in accordance with an exemplary embodiment. The substation automation system 10 shown in FIG. 4 differs from the substation automation system 10 shown in FIG. 3 in that a command redirection device 38 is coupled between the interface 12 and the data bus 16. The command redirection device 38 is adapted to transparently switch over between the main control devices 20a, 20b, 20c and the backup control devices 32a, 32b, 32c for control and/or protection operations. The command redirection device 38 may be a physical device connected between the data bus 16 (that may be a station bus 16) and the SCADA system 14. The SCADA system 14 and the interface 12 may be configured such that they are only aware of the main IEDs 20a, 20b, 20c or main control devices 20a, 20b, 20c. The switch over between the main control devices 20a, 20b, 20c to the backup control devices 32a, 32b, 32c is done by the command redirection device 38. Even in the case of a failure of one of the main control devices 20a, 20b, 20c, the SCADA system 14 and the interface 12 do not have to be aware of the backup control devices 32a, 32b, 32c.

The aim of the command redirection device 38 is to supervise the state of the main control devices 20a, 20b, 20c, i.e. working or faulty, to modify the control communications, i.e. the control commands, so the station-SCADA system 14 and the interface 12 seem to communicate to the same main control device 20a, 20b, 20c even in the case of a failure.

More precisely, for each main control device 20a, 20b, 20c, the command redirection device 38 can be modelled in two distinct states that will in the following be described with respect to the control devices 20a, 32b in the bay 18a. It has to be understood, that the same or similar is true for the main control devices 20b, 20c, 32b, 32c in the bays 18b and 18c.

The first state of the command redirection device 38 is the "normal" state. In this case, the first main control device 20a is alive or working properly. In this state, the station-SCADA system 14 communicates with the first main control device 20a through the command redirection device 38 for control operations, i.e. sends control commands to the main control device 20a. The command redirection device 38 checks at regular intervals the aliveness of the main control device 20a.

The second state of the command redirection device 38 is the "faulty" state. In this state, the main control device 20a is down or has failed. In this state, the command redirection device 38 has detected the faultiness of the main control device 20a and identifies the backup control device 32a in the case of the main control device 20a fails. When the station-SCADA system 14 issues a control command, the destination address of the control command is still the one pointing to the main control device 20a. The command redirection device 38 intercepts the control commands and redirects it to the backup control device 32a. When the backup control device 32a sends back a confirmation of the command execution, the command redirection device 38 intercepts the data packet sent over the data bus 16 and modifies it according to main control device 20a. In this state, the station-SCADA system 14 seems to receive a confirmation sent by the main control device 20a.

During a faulty state, the command redirection device 38 keeps pinging the main control device 20a, i.e. regularly checking the faultiness of the main control device 20a, so for example when it is replaced by a maintenance technician, the redirection can stop and then the command redirection device 38 can go back to the normal state.

To make the redundancy of the control devices 20a, 20b, 20c transparent to the station-SCADA system 14, only a redirection device 38a has to be placed in the communication path between the SCADA system 14 and the control devices in the bays 18a, 18b, 18c. The command redirection device 38 only has to be aware of the different control devices 20a, 20b, 20c and has to know, which backup control device 32a, 32b, 32c is the backup control device of the respective main control device 20a, 20b, 20c. All the control commands issued and received by the station-SCADA system 14 or other command devices are going through the command redirection device 38, so that they can be modified by the command redirection device 38, if they have to be redirected to a backup control device 32a, 32b, 32c or are sent off by one of these control devices 32a, 32b, 32c.

It may be possible, that the operator of the station-SCADA system 14 or the command device has to reissue the control command, if one of the main control devices 20a, 20b, 20c fails right after it has acquired the right to operate the primary equipment 22a, 22b, 22c. In this case, it may be possible, that the backup control device 32a, 32b, 32c is not able to operate on it, since it cannot acquire the right to operate the primary equipment. In this situation, the control command has to be sent a second time, so that the backup control device can acquire the right to operate the primary equipment.

To keep the logic of the command redirection device 38 simple, it may be possible, that the command redirection device performs no state transfer as described in the above. For example, it is possible that at each time, the command redirection device 38 receives a control command, it pings the respective main control device 20a, 20b, 20c to check if the respective control device 20a, 20b, 20c has a failure, and after that redirects the control command if necessary. In this alternative embodiment, the command redirection device 38 may be a stateless device.

Figure 5:
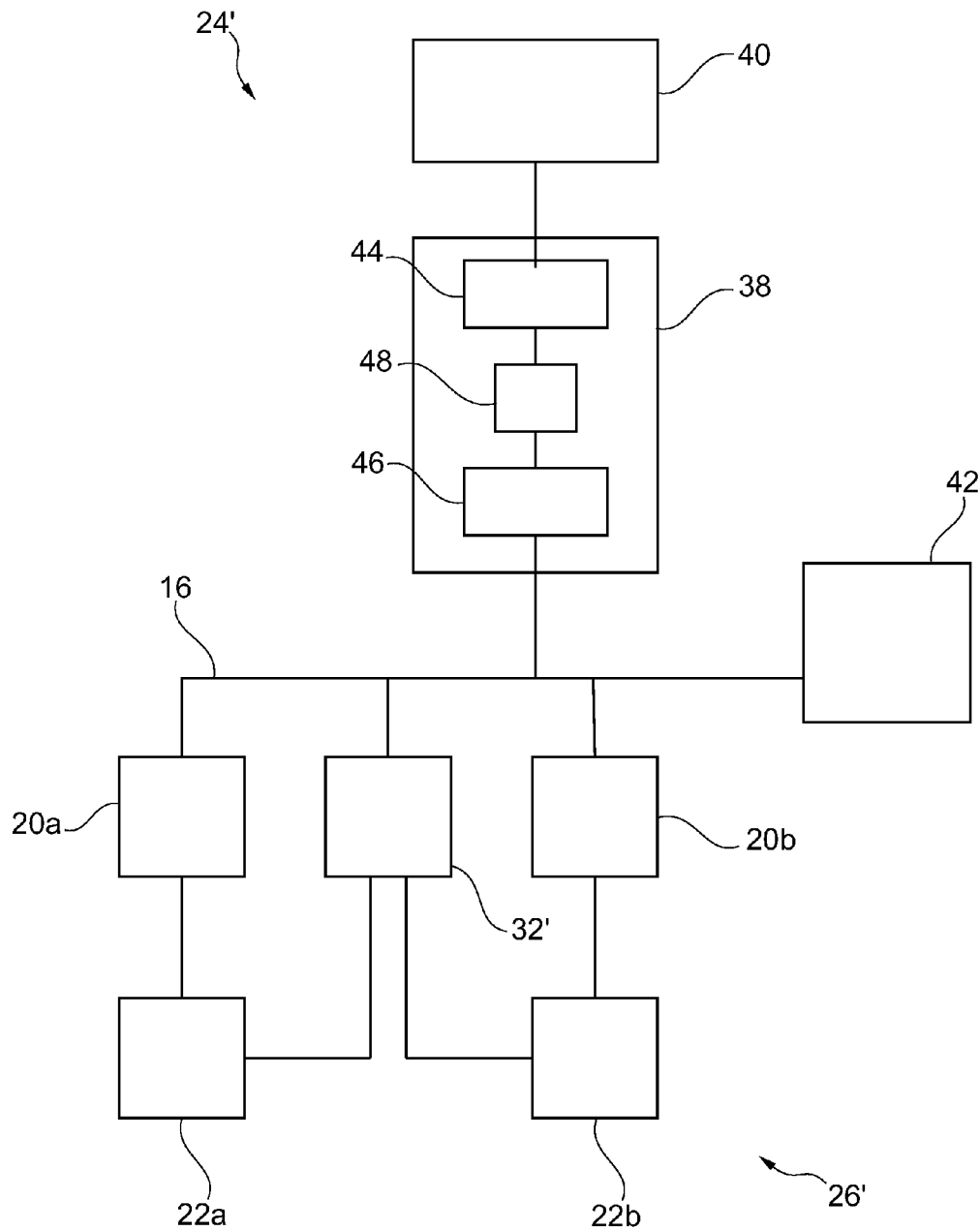
FIG. 5 shows a process control system in accordance with an exemplary embodiment.

FIG. 5 shows a process control system in accordance with an exemplary embodiment. The process control system 24' includes a command redirection device 38 and may receive control commands from a command device 40. For example, the command device 40 may be a station-SCADA system 14, but may also include control logic that is adapted to generate control commands without the interference of a human operator.

On the other side, the command redirection device 38 is connected to a data bus or data network 16.

The process control system 24' includes a first main control device 20a for controlling a first primary equipment 22a of the primary system 26' and a second main control device 20b for controlling a second primary equipment 22b of the primary system 26'. The main control devices 20a and 20b are connected for communication with the data bus 16. The process control system 24' includes further a backup control device 32' connected to the data bus 16 and adapted to control the first primary equipment 22a and the second primary equipment 22b. In case that one of the main control devices 20a, 20b fails, the backup control device 32' may take over the control and protection functionality from each of the main control devices 20a, 20b. To this end, the backup control device 32' may download the respective control module 34a, 34b and the respective protection module 36a, 36b from a database 42, for example via the data bus 16. For communication with the command device 40, the command redirection device 38 has a first interface 44 and for communication with the other components of the process control system 24', i.e. the main control devices 20a, 20b, the backup control device 32' and the database 42, the command redirection device 38 has a second interface 46 connected to the data bus 16. The second interface may be adapted to communicate with the IEC 61850, in particular with the IEC 61850-8, protocol.

The command redirection device 38 further includes a control logic 48 for performing the functionality of the command redirection device 38. For example, the interfaces 44 and 46 may be Ethernet cards and the control logic 48 may be a processor and a memory with stored program code or the control logic 48 may be a FPGA 48.

The database 42 may further be an identification device 42. For example, if there is more than one backup control device 32' or the command redirection device 38 is not aware of the network address of the backup device 32', the command redirection device 38 may request the address of the backup control device 32' from the database 42. There may be a lookup table in the database 42' and the command redirection device can request the address of the backup control device 32' with the address of one of the main control devices 20a, 20b.

Figure 6:
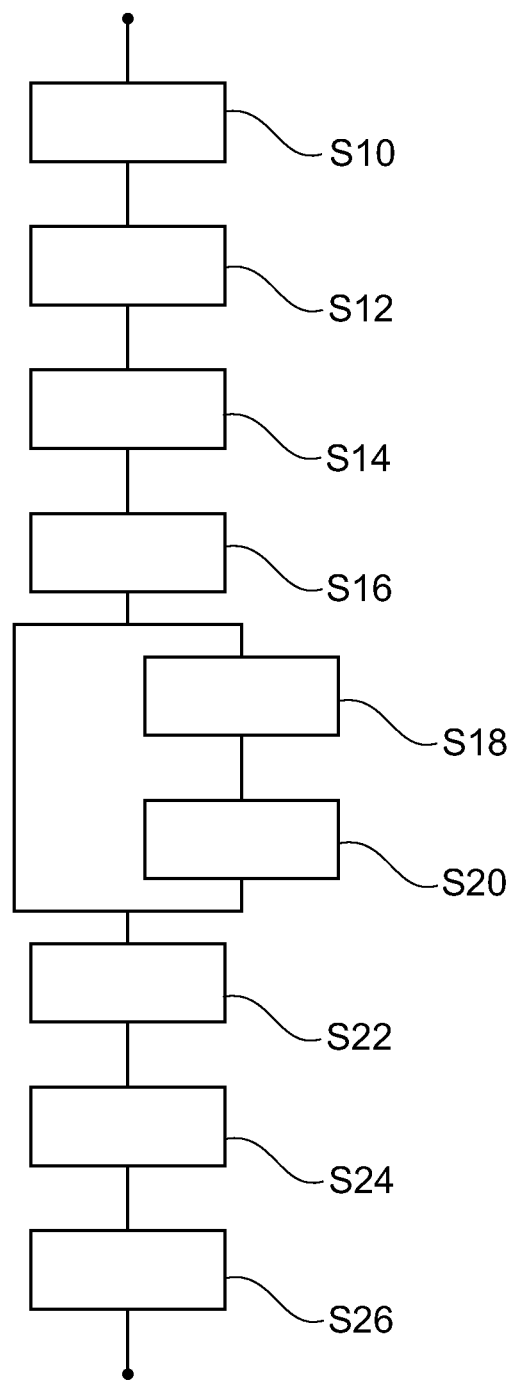
FIG. 6 shows a flow diagram of a method for a process monitoring system in accordance with an exemplary embodiment.

FIG. 6 shows a flow diagram of a method for a process monitoring system in accordance with an exemplary embodiment.

In a step S10, the command device 40, 14 sends a control command to the first main control device 20a.

In a step S12, the command redirection device 38 receives the control command over the first interface 44.

In a step S14, the control logic 48 of the command redirection device 38 extracts the address of the first main control device 20a (or from another main control device, in the case that a control command has been sent to another main control device) from the control command.

In a step S16, the command redirection device 38 pings the first main control device 20a (or the respective other main control device). To this end, the command redirection device 38 sends a ping command with the address of the first main control device 20a over the data bus 16. If the first main control device 20a answers the ping command, the command redirection device 38 interprets this as that the main control device 20a is working.

In the case that the first main control device 20a does not answer the ping command from the command redirection device 38, in a step S18, the command redirection device requests the identification or address of the backup control device 32' from the database 42.

In a step S20, the command redirection device 38 substitutes the address of the first main control device 20a with the address of the backup control device 32'. Additionally, in step S20, the command redirection device 38 may request the backup control device 32' to download the control and protection functionality of the first main control device 20a that is stored in the database 42.

After that, in both cases, if either the first main control device 20a has failed or not, the command redirection device sends the eventually modified control command via the second interface 46.

In a step S24, either the main control device 20a or the backup control device 32' receives the control command and executes it. After that, either the main control device 20a or the backup control device 32' sends back a confirmation of the execution of the control command to the command device 40. The confirmation is received by the command redirection device 38 with the second interface 46. Again, the control logic 48 checks, if the message is from a main control device 20a, 20b or from the backup control device 32'. In the case that the confirmation is from the backup control device 32', the control logic 48 replaces the address of the backup control device by the respective address of the main control device 20a, 20b and after that sends the eventually modified message off via the first interface 44 to the command device 40.

FIG. 7 shows a first program element in accordance with an exemplary embodiment of the disclosure. As shown in FIG. 7, a program element that can be executed by the control logic 48 of the command redirection device 38. In particular, FIG. 7 illustrates the logic of the command redirection device 38 for the pinging task or pinging step. The command redirection device 38 regularly sends heartbeat signals to the main control device 20a, 20b, 20c. For the exemplary program element of FIG. 7, it has been assumed that the control devices are IEDs 20a, 20b, 20c.

The program element of FIG. 7 contains a loop that is executed in parallel for each IED of the plurality of IEDs of the process control system 24, 24'. The addresses of the IEDs are stored in the list "ListIEDS".

During the loop, the command redirection device 38 pings an IED "ied" and after that waits for a predefined time period "time_out" for an answer of the ping command.

If the command redirection device 38 does not receive the answer of the ping command after the time period "time_out", the command redirection device sets the redirection. In this case, the command redirection device 38 retrieves the backup IED, for example with the aid of the database 42 and redirects the connection from the IED with the address "ied" to the IED with the address "ied_backup". The command redirection device 38 is in the "faulty" state for the IED "ied".

If the redirection device 38 receives the answer from the pinged IED "ied", a direct connection is set for the IED with the address "ied". The command redirection device 38 is in the "normal" state for the IED "ied".

FIG. 8 shows a second program element in accordance with an exemplary embodiment of the disclosure. In particular, FIG. 8 shows an exemplary program element that can be executed by the control logic 48 of the command redirection device 38. FIG. 8 represents the logic in the case of a control command in a normal state and faulty state. The function "sendToIED" is executed, when the command redirection device 38 receives a data packet comprising the control command "command".

In the case, the command redirection device 38 is in the faulty state ("redirect=true"), the destination address or destination IP of the control command "command" is modified. After that, in both cases, i.e. in the faulty state and in the state, the command is forwarded to the data bus 16.

FIG. 9 shows a third program element in accordance with an exemplary embodiment of the disclosure. FIG. 9 shows another exemplary program element that can be executed by the control logic 48 of the command redirection device 38. FIG. 9 represents the logic in the case of a confirmation of a control operation or control command in a normal state and in a faulty state of the command redirection device 38. The function "sendToSCADA" is executed, when the command redirection device 38 receives a data packet "confirmation" containing the confirmation of the control operation of one of the control devices 20a, 20b, 20c, 30a, 30b, 30c, 32'. If the command redirection device 38 is in the faulty state, the source address or source IP of the confirmation is modified, i.e. the address of the backup control device is replaced by the address of the respective main control device.

After that in both states, the confirmation is forwarded to the command device 40 via the interface 44.

The functional modules can be implemented as programmed software modules or procedures, respectively; however, one skilled in the art will understand that the functional modules can be implemented fully or partially in hardware.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practicing the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 10 substation automation system
12 interface to SCADA system
14 SCADA system
16 data bus, data network
18a, 18b, 18c bay
20a, 20b, 20c IED (main control device)
22a, 22b, 22c primary equipment
24, 24' process control system
26, 26' primary system
28a, 28b protection device
30a, 30b redundant protection device
32a, 32b, 32c redundant IED (backup control device)
34a, 34b protection module
36a, 36b redundant protection module
38 command redirection device
40 command device
32' backup control device
42 database
44 first interface
46 second interface
48 control logic

What is claimed is:

1. A command redirection device for a process control system, the process control system comprising:
a main control device for controlling primary equipment of a primary system; and
a backup control device for controlling the primary equipment in case of a failure of the main control device,
wherein the command redirection device is adapted to receive a control command destined to the main control device, and redirect, in the event of a failure of the main control device, said control command to the backup control device, and
wherein the command redirection device is adapted to modify a confirmation message confirming the execution of the control command and transmitted by the backup control device by replacing an identification of the backup control device included in the confirmation message with an identification of the main control device.

2. The command redirection device of claim 1, wherein the command redirection device is adapted to detect a failure of the main control device.

3. The command redirection device of claim 1,
wherein the control command comprises an identification of the main control device, and
wherein, for redirecting the control command, the command redirection device is adapted to modify the control command by replacing the identification of the main control device with an identification of the backup control device.

4. The command redirection device of claim 3,
wherein the command redirection device is adapted to request the identification of the backup control device by sending the identification of the main control device to an identification device, and to receive the requested backup identification from the identification device in response.

5. The command redirection device of claim 1,
wherein the command redirection device has a first communication interface for connection to a command device, the command device being adapted to generate the control command,
wherein the command redirection device is adapted to receive the control command from the command device,
wherein the command redirection device has a second communication interface for connection, via a data network, to the main control device and the backup control device, and
wherein the command redirection device is adapted for transmitting the control command to the main control device and the backup control device.

6. The command redirection device of claim 1,
wherein the process control system comprises a further main control device for controlling a further primary equipment of the primary system,
wherein the backup control device is adapted for controlling the further primary equipment, wherein the command redirection device is adapted to detect a failure of the further main control device, and wherein the command redirection device is adapted to redirect a control command for the further main control device to the backup control device, if a failure of the further main control device has been detected.

7. A process control system for a primary system, comprising:
- a command device for generating control commands for a piece of primary equipment;
- the main control device for controlling the piece of primary equipment of the primary system;
- the backup control device for controlling the piece of primary equipment in case of a failure of the main control device; and
- the command redirection device of claim 1.

8. The process control system of claim 7, comprising:
a data network,
wherein the main control device and the backup control device are connected to the data network,
wherein the control command is a data package transmitted by the data network,
wherein the main control device is identified by a first network address,
wherein the backup control device is identified by a second network address, and
wherein the command redirection device transmits, over the data network, the data packages to the main control device and the backup control device.

9. The process control system of claim 7, comprising:
a further main control device,
wherein the backup control device is configured to perform the control functionality of the main control device, if a failure of the main control device has been detected by the command redirection device, and of the further main control device, if a failure of the further main control device has been detected by the command redirection device.

10. The process control system of claim 8, comprising:
a further main control device,
wherein the backup control device is configured to perform the control functionality of the main control device, if a failure of the main control device has been detected by the command redirection device, and of the further main control device, if a failure of the further main control device has been detected by the command redirection device.

11. A SCADA system, comprising:
the command redirection device of claim 1,
wherein the SCADA system is adapted for generating the control command.

12. The SCADA system of claim 11,
wherein the command redirection device is adapted to detect a failure of the main control device.

13. The SCADA system of claim 11,
wherein the control command comprises an identification of the main control device, and
wherein, for redirecting the control command, the command redirection device is adapted to modify the control command by replacing the identification of the main control device with an identification of the backup control device.

14. The SCADA system of claim 11,
wherein the command redirection device is adapted to request the identification of the backup control device by sending the identification of the main control device to an identification device, and to receive the requested backup identification from the identification device in response.

15. The SCADA system of claim 11,
wherein the command redirection device has a first communication interface for connection to a command device, the command device being adapted to generate the control command,
wherein the command redirection device is adapted to receive the control command from the command device,
wherein the command redirection device has a second communication interface for connection, via a data network, to the main control device and the backup control device, and
wherein the command redirection device is adapted for transmitting the control command to the main control device and the backup control device.

16. The SCADA system of claim 11,
wherein the process control system comprises a further main control device for controlling a further primary equipment of the primary system,
wherein the backup control device is adapted for controlling the further primary equipment,
wherein the command redirection device is adapted to detect a failure of the further main control device, and
wherein the command redirection device is adapted to redirect a control command for the further main control device to the backup control device, if a failure of the further main control device has been detected.

17. A method for a process control system with a main control device and a backup control device being adapted for controlling primary equipment of a primary system, the method comprising the steps of:
- detecting a failure of the main control device;
- redirecting a control command destined for the main control device to the backup control device, if the failure of the main control device has been detected; and
- modifying a confirmation message confirming execution of the control command and transmitted by the backup control device by replacing an identification of the backup control device included in the confirmation message with an identification of the main control device.

18. A non-transitory computer-readable medium, in which a computer program for a process control system with a main control device and a backup control device being adapted for controlling primary equipment of a primary system is stored, which, when the computer program is executed by a processor, the processor executes a method comprising:
- detecting a failure of the main control device;
- redirecting a control command destined for the main control device to the backup control device, if the failure of the main control device has been detected; and
- modifying a confirmation message confirming execution of the control command and transmitted by the backup control device by replacing an identification of the backup control device included in the confirmation message with an identification of the main control device.

* * * * *